(12) United States Patent
Hong et al.

(10) Patent No.: US 7,489,502 B2
(45) Date of Patent: Feb. 10, 2009

(54) LATCHING MECHANISM FOR A FOLDABLE ELECTRONIC DEVICE

(75) Inventors: Lin-Yun Hong, Shenzhen (CN);
Hsuan-Chen Chen, Taipei Hsien (TW);
Chien-Li Tsai, Taipei Hsien (TW);
Chun-Chi Liang, Taipei Hsien (TW)

(73) Assignees: Hong Fu Jin Precision Industry (ShenZhen) Co., Ltd., Shenzhen, Guandong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 220 days.

(21) Appl. No.: 11/558,462

(22) Filed: Nov. 10, 2006

(65) Prior Publication Data

US 2007/0146986 A1 Jun. 28, 2007

(51) Int. Cl.
*H05K 5/00* (2006.01)
(52) U.S. Cl. ...................................................... 361/683
(58) Field of Classification Search ................ 361/683, 361/681, 801; 292/102, 106, 108, 128, 42; 220/324; 335/285, 205
See application file for complete search history.

(56) References Cited

U.S. PATENT DOCUMENTS

| | | | | |
|---|---|---|---|---|
| 4,901,882 A | * | 2/1990 | Goncalves | 220/324 |
| 6,108,196 A | * | 8/2000 | Jung | 361/683 |
| 2006/0109637 A1 | * | 5/2006 | Jiang et al. | 361/801 |
| 2006/0125585 A1 | * | 6/2006 | Lo et al. | 335/285 |
| 2006/0133025 A1 | * | 6/2006 | Wu et al. | 361/683 |
| 2007/0120373 A1 | * | 5/2007 | Zhang et al. | 292/42 |
| 2007/0171604 A1 | * | 7/2007 | Hong et al. | 361/683 |

* cited by examiner

*Primary Examiner*—Chandrika Prasad
(74) *Attorney, Agent, or Firm*—Wei Te Chung

(57) ABSTRACT

A foldable electronic device includes a base member, a latch member movably mounted to the base member, a resilient member, and a top member. The latch member includes a locking portion. The resilient member is mounted between the latch member and the base member. The top member has a shaft member pivotably mounted thereto. The shaft member includes a locking post. The locking post defines a locking slot therein, for receiving the locking portion of the latch member.

20 Claims, 8 Drawing Sheets

LATCHING MECHANISM FOR A FOLDABLE ELECTRONIC DEVICE

BACKGROUND OF THE INVENTION

1. Field of the Invention

The present invention relates to foldable electronic devices, and particularly to a foldable electronic device readily allowing installation or removal of a top member to or from a base member thereof.

2. Description of Related Art

A typical foldable electronic device, such as a notebook computer, includes a base member, and a top member pivotably mounted to the base member by hinges. The base member and the top member are both mounted to the hinges by screws or other fasteners. Generally, it is not convenient to remove the top member from the base member.

What is desired, therefore, is a foldable electronic device which readily allows installation or removal of a top member to or from a base member thereof.

SUMMARY OF THE INVENTION

An exemplary foldable electronic device includes a base member, a latch member movably mounted to the base member, a resilient member, and a top member. The latch member includes a locking portion. The resilient member is mounted between the latch member and the base member. The top member has a shaft member pivotably mounted thereto. The shaft member includes a locking post. The locking post defines a locking slot therein, for receiving the locking portion of the latch member.

Other advantages and novel features will become more apparent from the following detailed description when taken in conjunction with the accompanying drawings, in which:

DETAILED DESCRIPTION OF THE INVENTION

Figure 1:
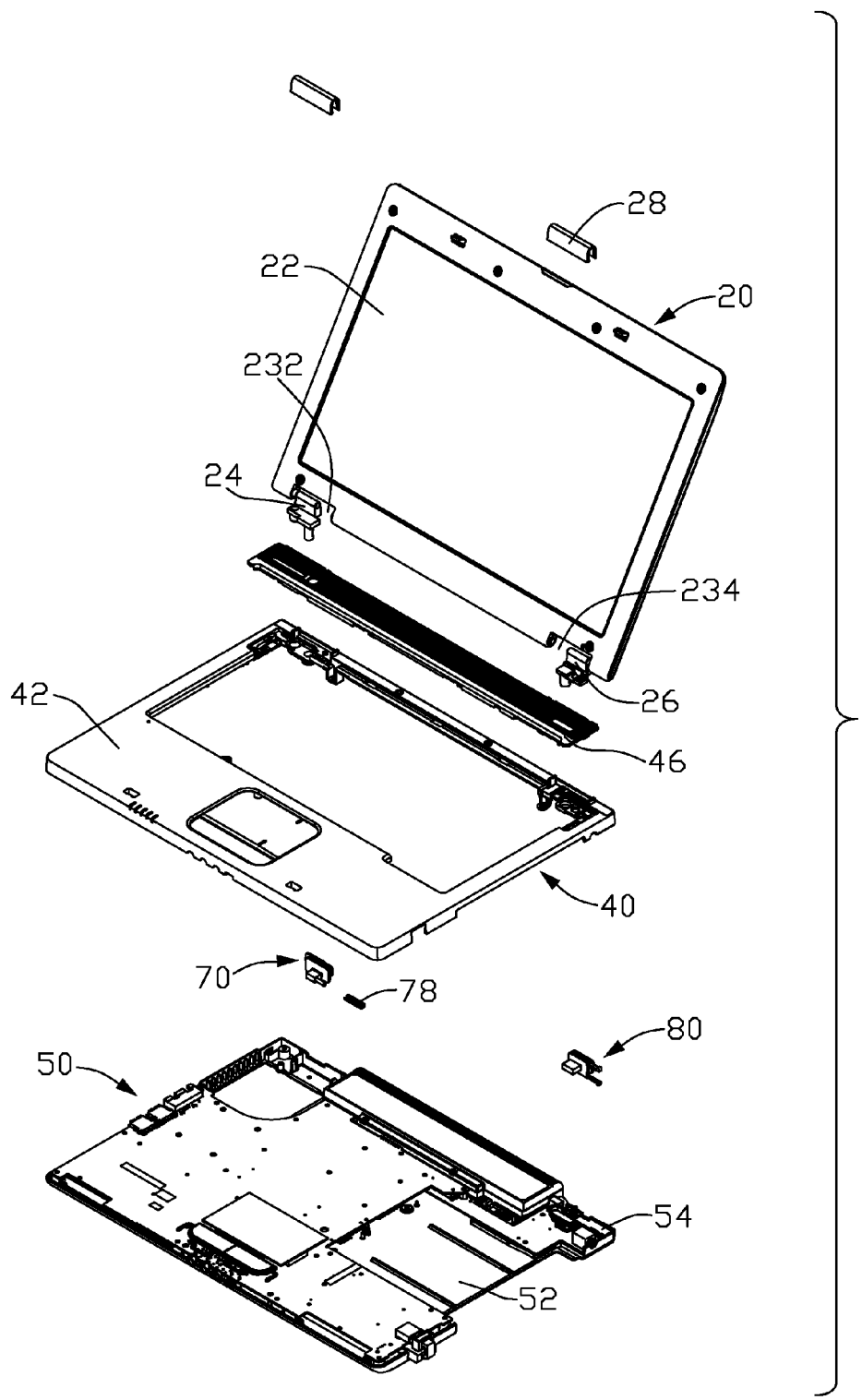
FIG. 1 is an exploded, isometric view of a foldable electronic device in accordance with a preferred embodiment of the present invention, the foldable electronic device includes a base member and a top member, the base member includes a bracket and a cover.
Figure 2:
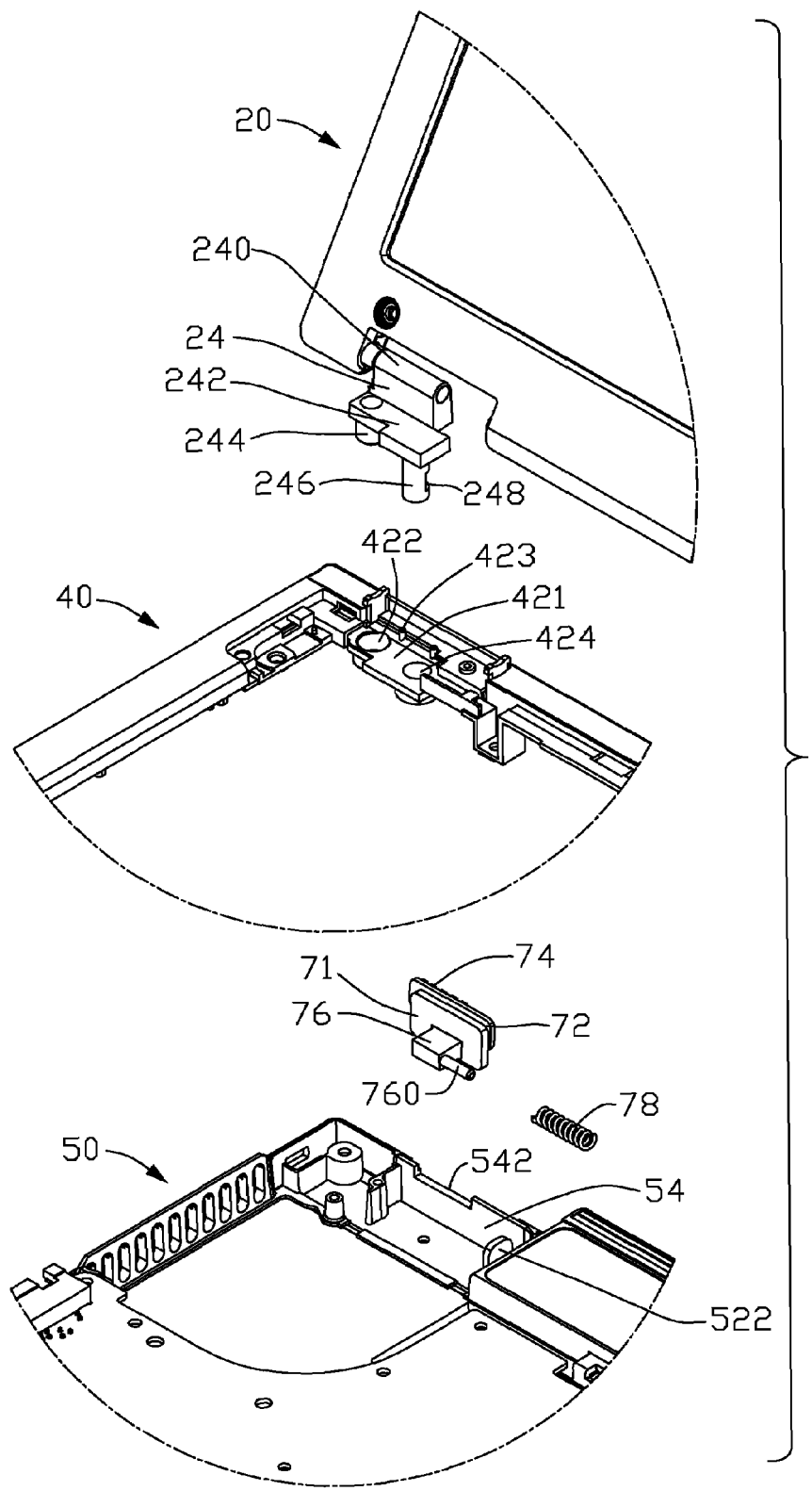
FIG. 2 is similar to FIG. 1, but a partial, enlarged view.
Figure 3:
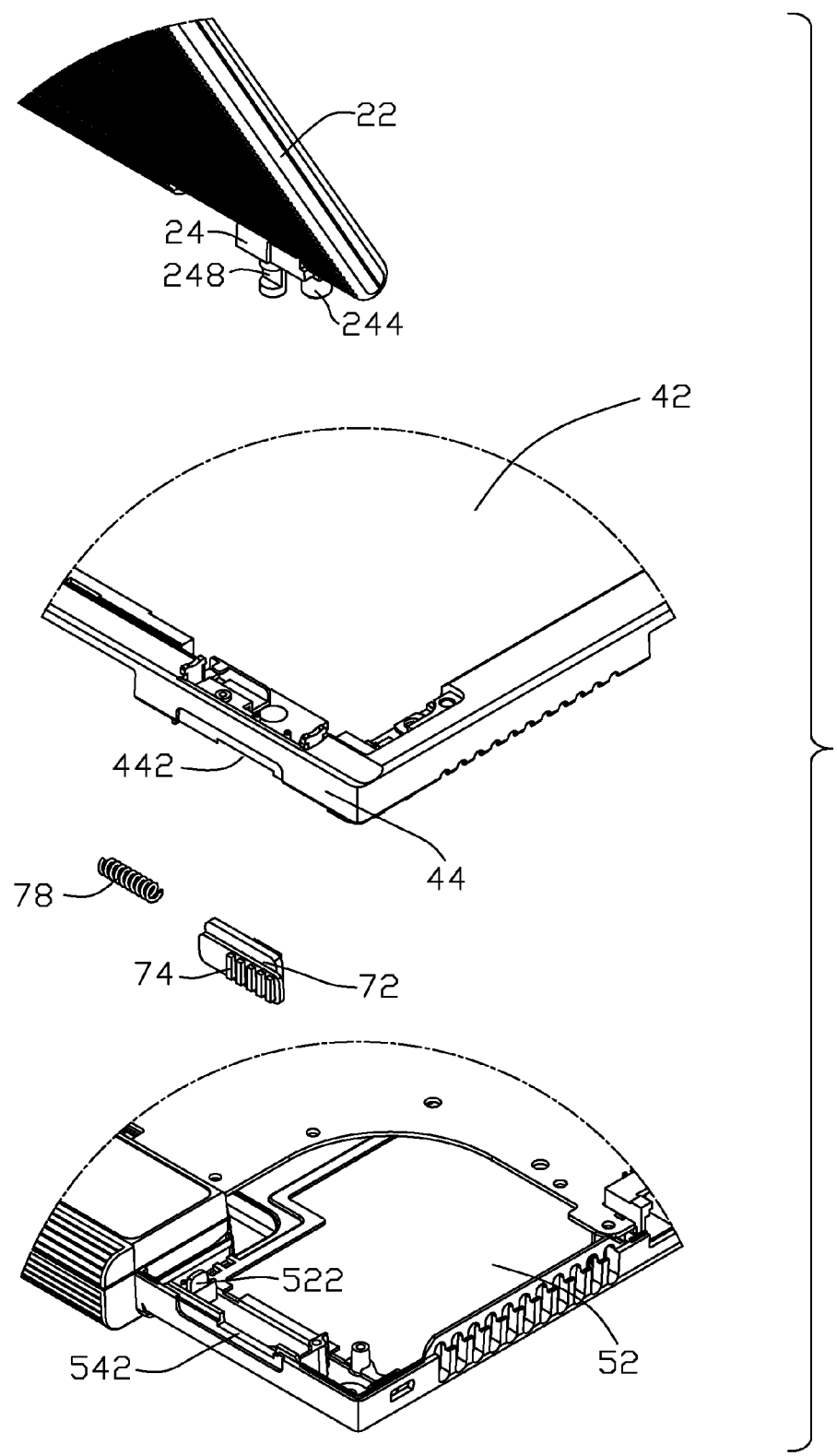
FIG. 3 is similar to FIG. 2, but viewed from another aspect.

Referring to FIG. 1, a foldable electronic device in accordance with a preferred embodiment of the present invention includes a base member, a first latch 70, a second latch 80, a resilient member 78, and a top member 20. In this preferred embodiment, the foldable electronic device is a notebook computer.

Referring also to FIGS. 2-5, the base member includes a bracket 50 for holding a circuit board (not labeled), and a cover 40.

The bracket 50 includes a bottom wall 52, and two flanges 54, 55 extending up from opposite ends of a rear side of the bottom wall 52. A cutout 542 is defined in the flange 54. A blocking tab 522 extends up from the bottom wall 52 adjacent the flange 54 and at a side of the cutout 542 away from the corresponding end of the rear side of the bottom wall 52. A cutout 552 is defined in the flange 55. A locking portion 556 is mounted to the rear side of the bottom wall 52 adjacent the cutout 552. A first locating slot 558 and a second locating slot 559 parallel to the first locating slot 558 are defined in the locking portion 556.

Figure 4:
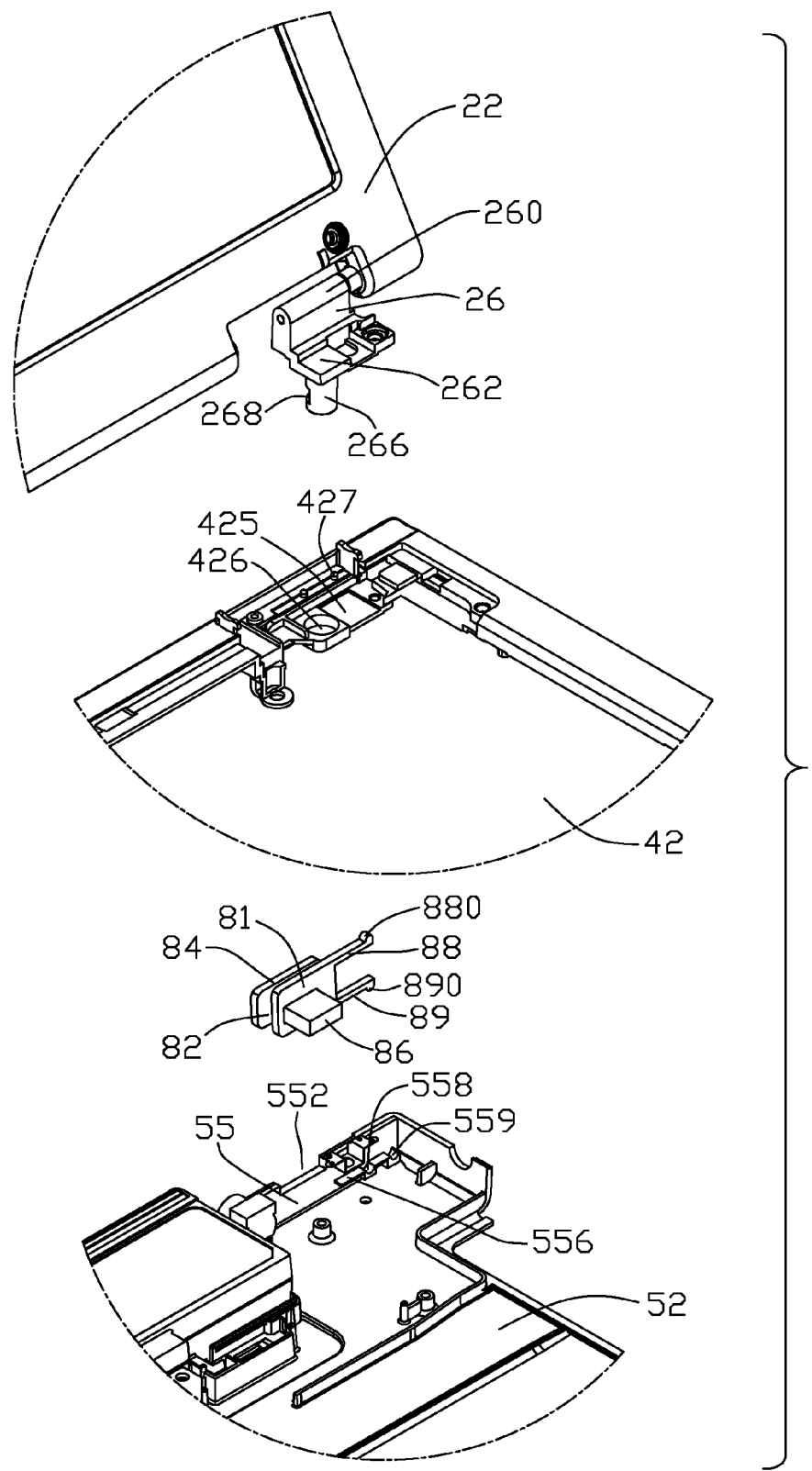
FIG. 4 is similar to FIG. 1, but a partial, enlarged view.
Figure 5:
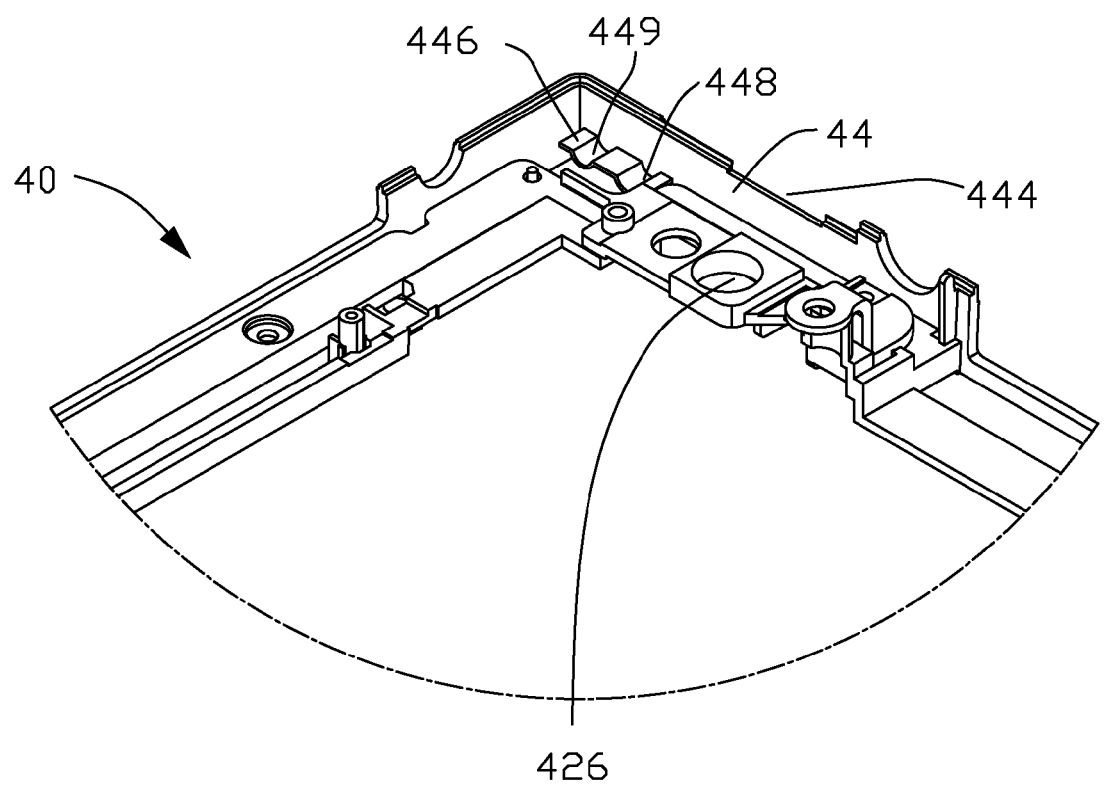
FIG. 5 is an isometric view of the cover of FIG. 3, but an inverted view.

The cover 40 includes a top wall 42, and a rear plate 44 extending up from a rear side of the top wall 42. An extending portion 421 extends forward from an end of the rear plate 44. A cutout 442 corresponding to the extending portion 421 is defined in a bottom of the corresponding end of the rear plate 44. An orientating hole 422 is defined in an end of the extending portion 421 adjacent the corresponding end of the rear plate 44. A through-hole 424 is defined in an opposite end of the extending portion 421. A pair of fixing posts 423 extends up from a rear side of the extending portion 421. Referring to FIGS. 4-5, an extending portion 425 extends forward from an opposite end of the rear plate 44. A cutout 444 corresponding to the extending portion 425 is defined in a bottom of the corresponding end of the rear plate 44. A through-hole 426 is defined in the extending portion 425. A pair of fixing posts 427 extends up from a rear side of the extending portion 425. A locating member 446 is mounted to a bottom of the top wall 42 adjacent the extending portion 425. A third locating slot 448 and a fourth locating slot 449 parallel to the third locating slot 448 are defined in the locating member 446.

Referring to FIG. 2 again, the first latch 70 includes a body 71, an operating portion 74 at a rear side of the body 71, and a locking portion 76 at a front side of the body 71. A post 760 extends from a side of the locking portion 76. A groove 72 is defined in the first latch 70 between the body 71 and the operating portion 74. Thus, a slim portion (not shown) is defined between the body 71 and the operating portion 74.

Referring to FIG. 4, the second latch 80 includes a body 81, an operating portion 84 at a rear side of the body 81, and a locking portion 86 at a front side of the body 81. A first arm 88 and a second arm 89 extend from a top and a bottom of an end of the body 81 respectively. A first protrusion 880 protrudes from a distal end of the first arm 88 at the top of the end of the body 81. A second protrusion 890 protrudes from a distal end of the second arm 89. A groove 82 is defined in the second latch 80 between the body 81 and the operating portion 84. Thus, a slim portion (not shown) is defined between the body 81 and the operating portion 84.

The top member 20 for holding a liquid crystal display panel 23 defines two mounting slots 232, 234 in opposite ends of a bottom thereof. A first shaft member 24 is received in the mounting slot 232 and pivotably mounted to the top member 20 at a side of the mounting slot 232. A second shaft member 26 is received in the mounting slot 234 and pivotably mounted to the top member 20 at a side of the mounting slot 234.

The first shaft member 24 includes a pivot part 240, and a mounting part 242 extending forward from a bottom of the pivot part 240. The pivot part 240 is pivotably mounted to the top member 20. An orientating post 244 and a locking post 246 extend down from the mounting part 242. A locking slot 248 is defined in a rear side of the locking post 246. A pair of fixing holes (not shown) is defined in the bottom of the pivot part 240.

The second shaft member 26 includes a pivot part 260, and a mounting part 262 extending forward from a bottom of the pivot part 260. The pivot part 260 is pivotably mounted to the top member 20. A locking post 266 extends down from the mounting part 262. A locking slot 268 is defined in a rear side of the locking post 266. A pair of fixing holes (not shown) is defined in the bottom of the pivot part 260.

Figure 6:
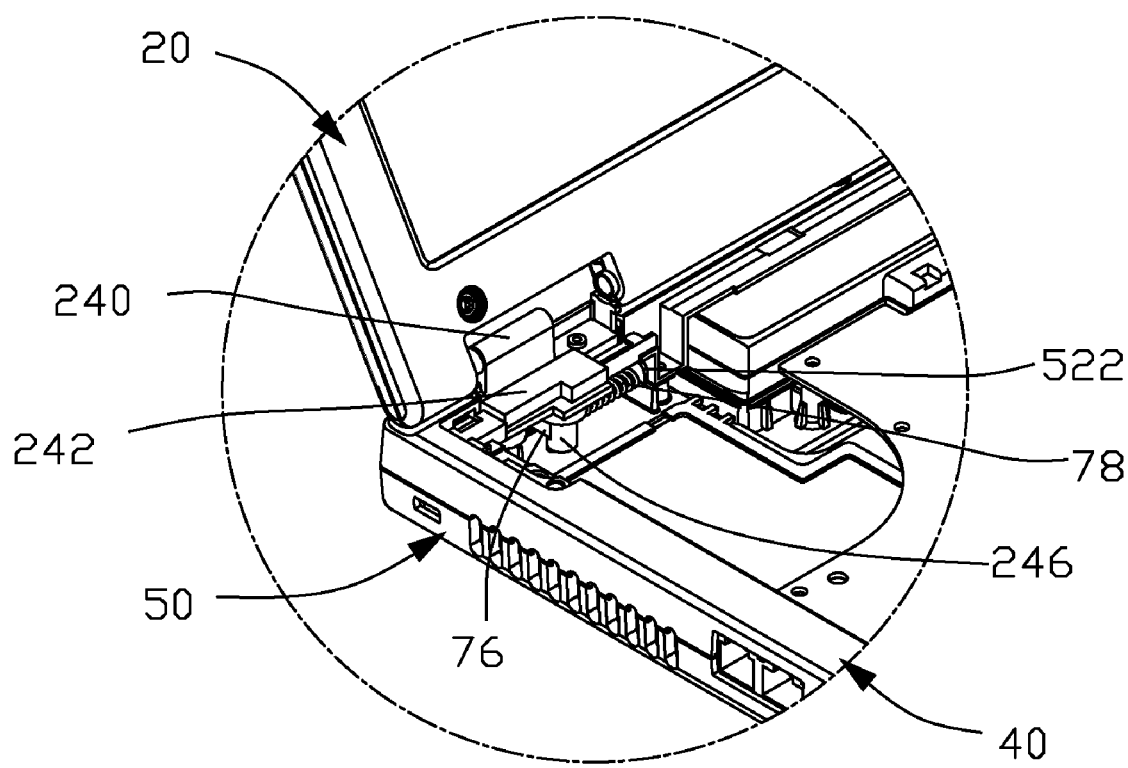
FIG. 6 is an assembled view of FIG. 2, but viewed from another aspect.
Figure 7:
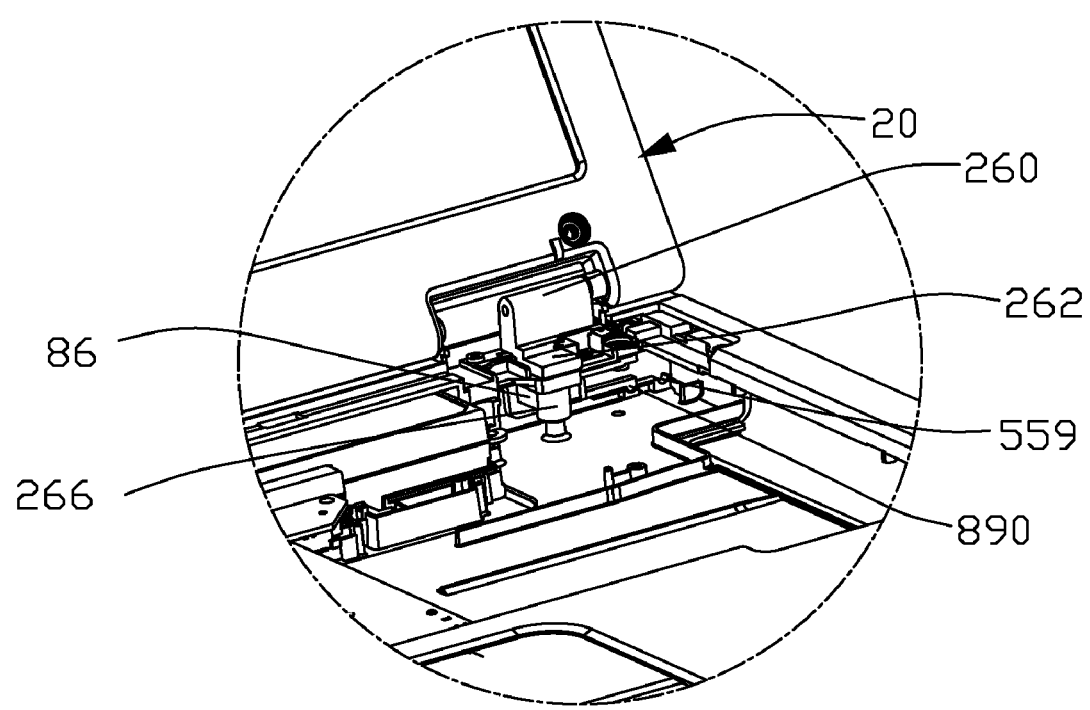
FIG. 7 is an assembled view of FIG. 4.
Figure 8:
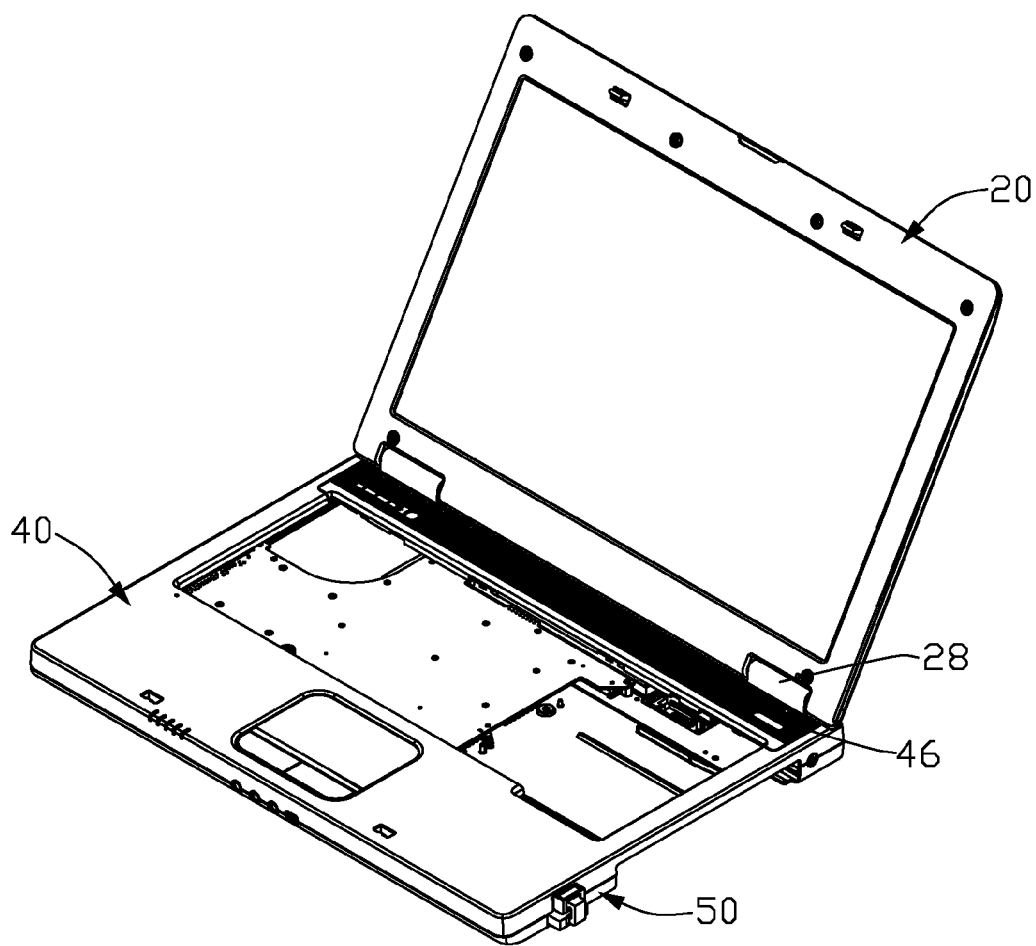
FIG. 8 is an assembled view of FIG. 1.

Referring also to FIGS. 6-8, in assembly, the first latch 70 and the second latch 80 are placed on the bracket 50. The resilient member 78, such as a coil spring, fits about the post 760 of the first latch. The slim portion of the first latch 70 is received in the cutout 542 of the bracket 50, thus locating the operating portion 74 against an outside of the bracket 50, and the body 71 against an inside of the bracket 50, with the resilient member 78 located between the body 71 and the blocking tab 522. The slim portion of the second latch 80 is received in the cutout 552 of the bracket 50, thus locating the operating portion 84 against an outside of the bracket 50, and the body 81 against an inside of the bracket 50. The first protrusion 880 of the second latch 80 is located in the locking slot 558 in a locked position, or the locking slot 559 in an unlocked position, of the bracket 50. Then the cover 40 is mounted to the bracket 50, with the cutout 442 accommodating the slim portion of the first latch 70, and the cutout 444 accommodating the slim portion of the second latch 80. Then the second protrusion 890 of the second latch 80 is located in the third locating slot 448 (if the first protrusion 880 is in the first locking slot 558), or the fourth locating slot 449 (if the first protrusion 880 is in the second locking slot 559), of the cover 40.

In preparation for mounting the top member 20 to the base member, the first and second protrusions 880, 890 of the second latch 80 are located in the locking slots 559, 449 respectively corresponding the unlocked position. The first latch 70 is pushed to resiliently compress the resilient member 78. In mounting the top member 20 to the base member, the orientating post 244 of the first shaft member 24 is received in the orientating hole 422 of the base member. The locking post 246 extends through the through-hole 424 of the base member, with the locking slot 248 thereof under the extending portion 421 of the base member. The fixing posts 423 of the base member are engaged in the corresponding fixing holes of the first shaft member 24. The locking post 266 of the second shaft 26 extends through the through-hole 426 of the base member, with the locking slot 268 thereof under the extending portion 425 of the base member. The fixing posts 427 of the base member are engaged in the corresponding fixing holes of the second shaft member 26. The first latch 70 is released to rebound back via the resilient member 78. The locking portion 76 of the first latch 70 is engaged in the locking slot 248 of the first shaft member 24. The second latch 80 is pushed to slide toward the first latch 70. The first and second protrusions 880, 890 of the second latch 80 disengage from the fourth locating slot 449 of the cover 40 and the second locating slot 559 of the bracket 50, and engage in the third locating slot 448 of the cover and the first locating slot 558 of the bracket 50, respectively in the locked position. The locking portion 86 of the second latch 80 is engaged in the locking slot 268 of the second shaft member 26. Thus, the top member 20 is mounted to the base member.

A decorative plate 46 is mounted to the rear side of the top wall 42 of the cover 40 to cover the mounting parts 242, 262 of the first and second shaft members 24, 26, and two decorative unshaped covers 28 cover the pivot parts 240, 260 of the first and second shaft members 24, 26, for enhancing aesthetics of the notebook computer.

In dismounting the top member 20 from the base member, the second latch 80 is pushed to slide away from the first latch 70 via operation on the operating portion 84. The first and second protrusions 880, 890 of the second latch disengage from the third locating slot 448 of the cover 40 and the first locating slot 558 of the bracket 50, to engage in the fourth locating slot 449 of the cover 40 and the second locating slot 559 of the bracket 50. The locking portion 86 of the second latch 80 is disengaged from the locking slot 268 of the second shaft member 26. The first latch 70 is pushed to compress the resilient member 78. The locking portion 76 of the first latch 70 is disengaged from the locking slot 248 of the first shaft member 24. Thus, the top member 20 is easily removed from the base member.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment of the invention.

What is claimed is:

1. A foldable electronic device, comprising:
   a base member;
   a latch member movably mounted to the base member, the latch member comprising a locking portion;
   a resilient member mounted between the latch member and the base member; and
   a top member with a shaft member pivotably mounted thereto, the shaft member comprising a locking post, the locking post defining a locking slot therein, for receiving the locking portion of the latch member.

2. The foldable electronic device as claimed in claim 1, wherein the base member comprises a bracket, and a cover mounted to the bracket, the latch member is movably mounted between the bracket and the cover.

3. The foldable electronic device as claimed in claim 2, wherein the latch member is mounted to and slides along rear sides of the bracket and the cover.

4. The foldable electronic device as claimed in claim 3, wherein a post extends from the locking portion of the latch member, a blocking tab extends up from the bracket, a distal end of the post faces the blocking tab, the resilient member fits about the post with opposite ends thereof engaging with the locking portion and the blocking tab respectively.

5. The foldable electronic device as claimed in claim 2, wherein an extension portion is formed in the cover, a through-hole is defined in the extension portion, for the locking portion of the shaft member extending therethrough.

6. The foldable electronic device as claimed in claim 5, wherein the shaft member comprises a pivot part pivotably mounted to a bottom of the top member, and a mounting part extending from a bottom of the pivot part, the locking portion extends down from the mounting part.

7. The foldable electronic device as claimed in claim 6, wherein a pair of fixing posts extends up from the extension portion of the cover, a pair of fixing holes is defined in a bottom of the mounting part, for receiving the corresponding fixing posts of the extension portion.

8. The foldable electronic device as claimed in claim 1, wherein the latch member comprises a body located against an inside of the base, and an operating portion located against an outside of the base, the locking portion extends from the body opposite to the operating portion.

9. A foldable electronic device, comprising:
   a base member;
   a latch member mounting between a locked position and an unlocked position of the base member, the latch member comprising a locking portion; and
   a top member with a shaft member pivotably mounted thereto, the shaft member comprising a locking post, the locking post defining a locking slot therein, for receiving the locking portion of the latch member when the latch member in the locked position.

10. The foldable electronic device as claimed in claim 9, wherein the base member comprises a bracket, and a cover mounted to the bracket, the latch member is movably mounted between the bracket and the cover.

11. The foldable electronic device as claimed in claim 10, wherein the latch member is mounted to and slides along rear sides of the bracket and the cover.

12. The foldable electronic device as claimed in claim 11, wherein a resilient arm extends from a side of the locking portion of the latch member, a first locating slot and a second locating slot are defined in the cover, the latch member is in the locked position when a distal end of the resilient arm of the latch member is located in the first locating slot, the latch member is in the unlocked position when a distal end of the resilient arm of the latch member is located in the second locating slot.

13. The foldable electronic device as claimed in claim 10, wherein an extension portion is formed in the cover, a through-hole is defined in the extension portion, for the locking portion of the shaft member extending therethrough.

14. The foldable electronic device as claimed in claim 13, wherein the shaft member comprises a pivot part pivotally mounted to a bottom of the top member, and a mounting part extending from a bottom of the pivot part, the locking portion extends down from the mounting part.

15. The foldable electronic device as claimed in claim 14, wherein a pair of fixing posts extends up from the extension portion of the cover, a pair of fixing holes is defined in a bottom of the mounting part, for receiving the corresponding fixing posts of the extension portion.

16. The foldable electronic device as claimed in claim 9, wherein the latch member comprises a body located against an inside of the base, and an operating portion located against an outside of the base, the locking portion extends from the body opposite to the operating portion.

17. A foldable electronic device comprising:
   a base member;
   a top member with a pair of shaft members pivotably mounted thereto; and
   a pair of latch members for latching the top member with base member, the latch members being slidably mounted to the base member between a locked position at which the latch members engage with the shaft members respectively to thereby latch the top member with the base member and an unlocked position at which the latch members disengage from the shaft members respectively to thereby allow the top member to be removeable from the base member; wherein
   the base member comprises two locating structures configured for locating one of the latch members at the locked position and the unlocked position respectively.

18. The foldable electronic device as claimed in claim 17, wherein a resilient member is mounted between the base member and the other one of the latch members configured for driving the other one of the latch members to move from the unlocked position to the locked position.

19. The foldable electronic device as claimed in claim 17, wherein the base member comprises a bracket and a cover with the latch members mounted therebetween, each of the shaft members comprises a locking post extending through the cover to engage with a corresponding latch member when the latch members are in the locked position.

20. The foldable electronic device as claimed in claim 19, wherein the two locating structures comprises two pair of parallel locating slots formed between the bracket and the cover, and said one of the latch members comprises two resilient cantilevers each with a protrusion formed thereat for engaging with a corresponding pair of locating slots.

* * * * *